United States Patent Office.

PHILESTER LEE AND LEMUEL MATTHEWS, OF LEBANON, OREGON.

Letters Patent No. 101,279, dated March 29, 1870.

IMPROVED MEDICAL COMPOUND.

The Schedule referred to in these Letters Patent and making part of the same

To all whom it may concern:

Be it known that we, PHILESTER LEE and LEMUEL MATTHEWS, of Lebanon, in the county of Linn and State of Oregon, have invented a new and improved Medical Compound; and we do hereby declare that the following is a full, clear, and exact description thereof, which will enable others skilled in the art to make and use the same.

This invention relates to a new and useful medical compound, for use as a purgative and tonic, and consists of a liquid compound or sirup made from the bark of the tree found in Oregon and its vicinity, and popularly known there as the "Chitum" or "Bear-berry tree," and also as the "Oregon three-seed black-cherry tree," and the root of a certain kind of milk-weed, also found in the same locality, and known as the "red-stalk milk-weed," in the proportion of fifteen parts of the former to one of the latter.

The said ingredients are boiled together in water, to make a strong infusion, which is afterward strained to remove the solid matter, and then reduced to a sirup, to be taken inwardly in doses of about a teaspoonful, but varying in amount as found best, according to circumstances.

We also propose to prepare it for use in any suitable or approved way in the form of pills.

To preserve the said compound from fermentation, we mix it with alcohol or other like substances.

Having thus described our invention,

We claim as new and desire to secure by Letters Patent—

The improved medical compound, consisting of the ingredients herein specified, prepared in the proportions and manner substantially as specified.

PHILESTER LEE.
LEMUEL MATTHEWS.

Witnesses:
  D. ANDREWS,
  I. C. MACQUADE.